UNITED STATES PATENT OFFICE.

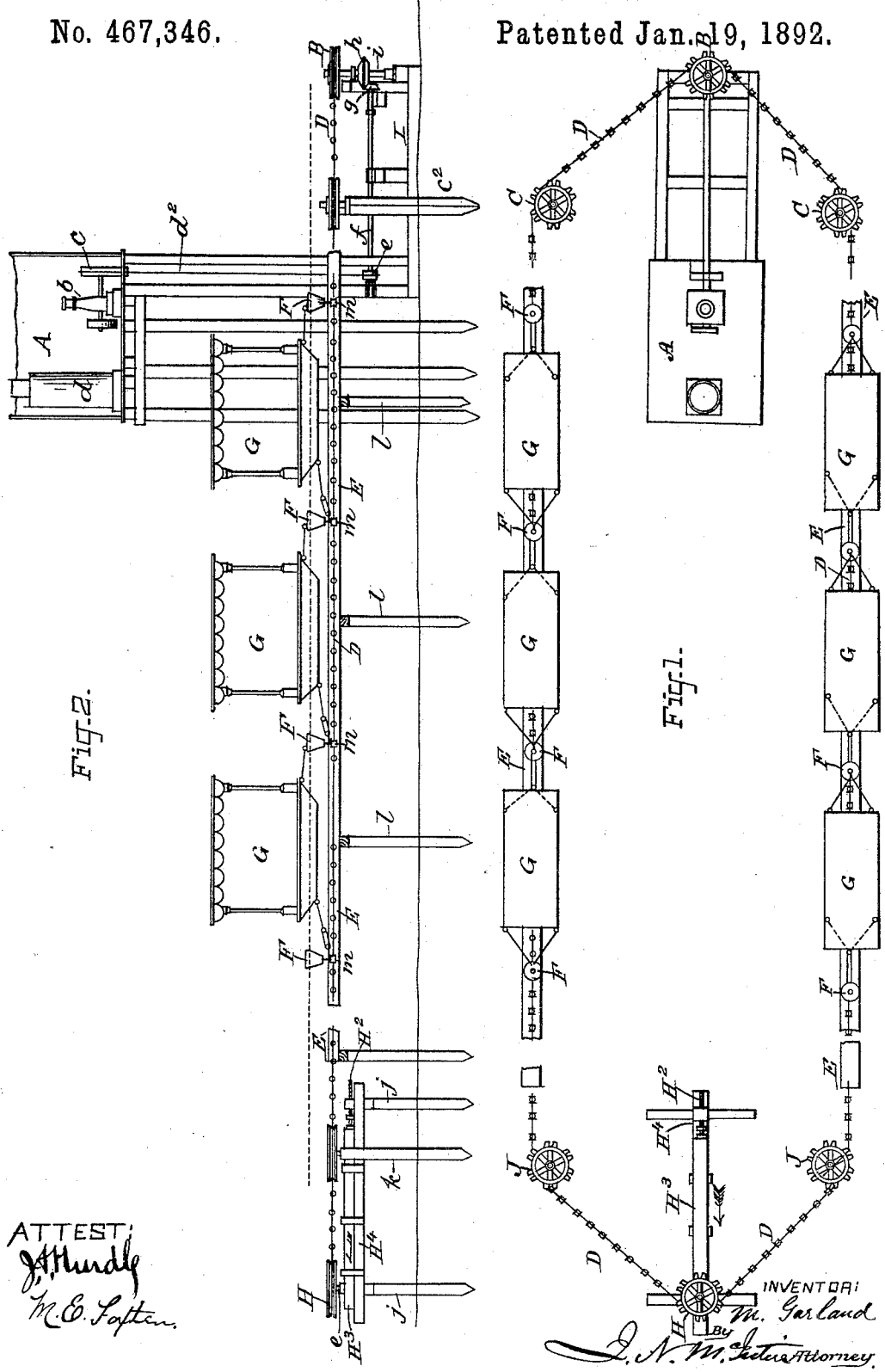

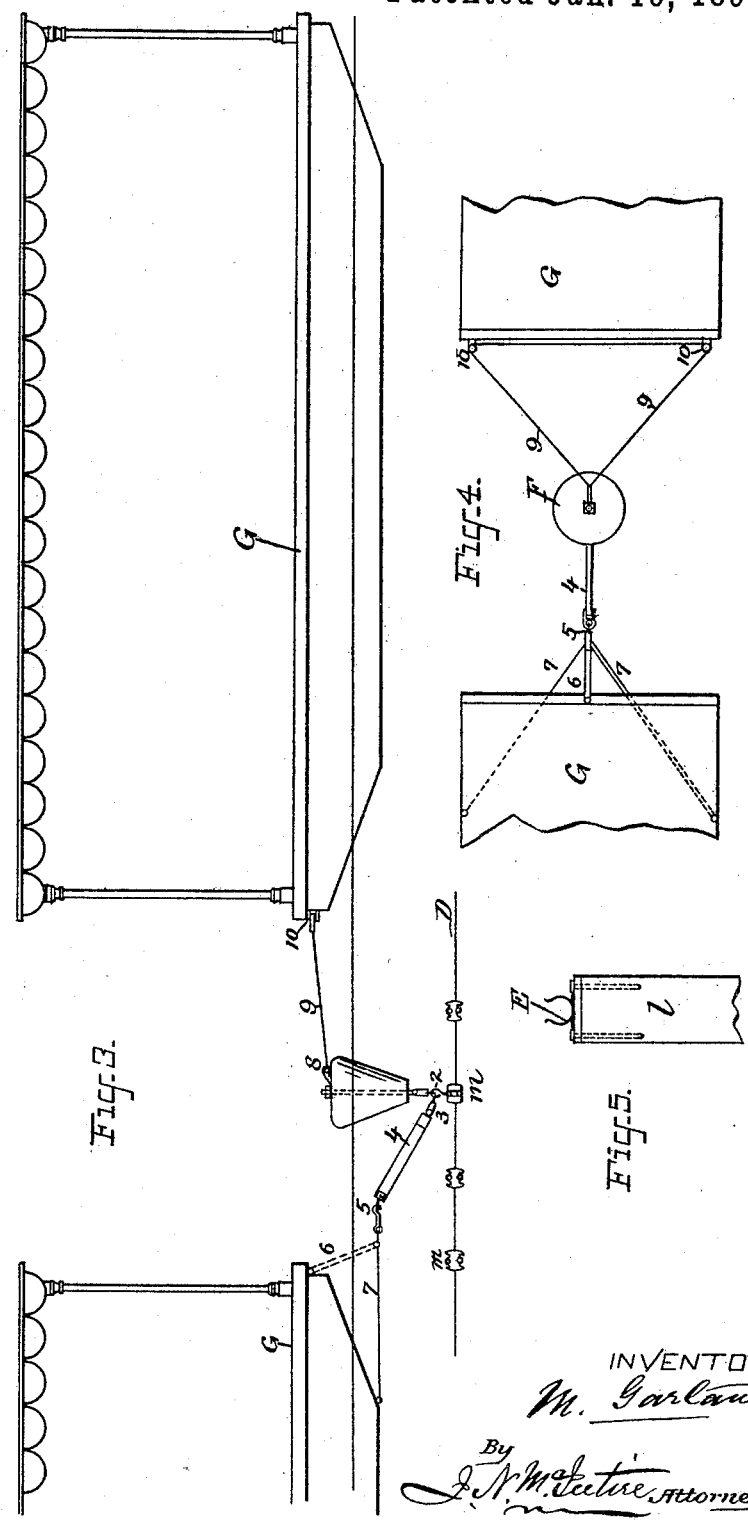

MICHAEL GARLAND, OF BAY CITY, MICHIGAN.

CABLE-DRIVEN-GONDOLA SYSTEM.

SPECIFICATION forming part of Letters Patent No. 467,346, dated January 19, 1892.

Application filed October 20, 1891. Serial No. 409,244. (No model.)

*To all whom it may concern:*

Be it known that I, MICHAEL GARLAND, of Bay City, in the county of Bay and State of Michigan, have invented an Improved Cable-Driven-Gondola System; and I do hereby declare that the following is a full, clear, and exact description of the same, reference being had to the accompanying drawings, forming part of this specification.

My present invention relates to a system of pleasure boats or gondolas driven or impelled through a circuit or circuitous route by means of an endless submerged driving-cable to which motion is imparted from any suitable engine or motor. I had previously to my invention devised such a system of pleasure-boats, and have in a previous application, Serial No. 379,841, filed January 22, 1891, shown and described a series of boats driven by a submerged cable. In carrying my ideas into practice, however, I have found it necessary to devise many changes in and make certain improvements on such a system of cable-driven gondolas as I had previously devised, and having now put into practical operation and successfully run my improved system or arrangement of gondolas driven by a sprocket-cable, (at Winona Beach, Michigan,) I desire to cover by this separate application those improvements which have rendered successful, in a practical point of view, the system or plant that I am now and have been for some time operating.

The character or nature of my said improvements will be disclosed in the following description or explanations, and the several features of my present invention will be found particularly pointed out in the claims of this specification.

To enable those skilled in the art to understand and practice my invention, I will now proceed to more fully describe it, referring by letters and figures to the accompanying drawings, which form part of this specification, and in which I have shown said invention carried into effect in precisely the form or arrangement of devices under which I have so far practiced it.

In the drawings, Figure 1 is a plan view of a plant or combination of devices embracing my present improvements. Fig. 2 is a side elevation of the same. Fig. 3 is a partial side view of the same, but drawn on an enlarged scale to better and more fully show detail constructions. Fig. 4 is a partial top view or plan, enlarged scale, of the devices seen at Fig. 3 on the same scale. Fig. 5 is a detail view showing in elevation one of the posts, on a series of which is supported the metallic trough in which one of the long straight runs of the sprocket-cable travels and also showing in cross-section the said cable and trough.

In the several figures the same part or device will be found designated always by the same letter or numeral of reference.

In the drawings, A represents a boiler and engine-house, which is built upon and supported by suitable posts or piles which, as shown, (see Fig. 2,) are driven into the ground or earth forming the bed of a lake or other body of water. Within the said house are located any suitable forms of steam-boiler $d$ and engine $b$, on the main shaft of which is mounted the main drive-wheel $c$, which preferably is a sprocket-wheel, and from said wheel descends an endless drive-chain or metallic belt $d^2$, which at its lower turn or looped end portion engages with a sprocket-pinion $e$, that is mounted fast on a horizontal shaft $f$, arranged at a suitable distance below the surface of the water. This shaft $f$ is mounted, as shown, in suitable bearings supported upon the submerged and properly-anchored framework $l$, in the outer end of which is also mounted in suitable bearings a vertical shaft $i$, and through the medium of a beveled gear $h$, fast on the shaft $i$ and in engagement with a beveled gear $g$ on the shaft $f$, requisite motion and power are transmitted from the engine $b$ to the vertical shaft $i$ to drive the latter at the proper speed.

On the upper end of the vertical shaft $i$ is made fast the sprocket-wheel B, which, as shown, is located at the distance below the surface of the water, at which is arranged the endless sprocketed cable D, that is driven (in either direction) by the driving sprocket-wheel B. This sprocketed cable D passes tangentially in either direction (in the case shown at an angle of about forty-five degrees) from the driving sprocket-wheel B, and passes thence, as clearly shown, (see Fig. 1,) around two sprocket-wheel idlers C C, the vertical shafts or journals of which are properly supported at their upper ends by posts or piles $c^2$, (see Fig. 2,) driven into the beach or bottom of the lake or pond, the said sprocketed cable passing thence in parallel lines and for any requisite or desired distance to the peripheries of two other sprocket-wheel idlers J J, the shafts or arbors of which are in like manner sustained by the upper ends of the piles or posts $k$, and thence around the adjustable idler sprocket-wheel H, completing the circuit of the said endless cable. The vertical shaft or spindle of sprocket-wheel H is mounted upon the outer end of a horizontal adjustable beam $H^3$, which in turn is supported and slides upon a horizontal beam or frame-work $H^4$, that is firmly supported by and secured to the upper ends of suitable posts or piles $j$, the inner end of said sliding beam or bar $H^3$ being provided with a threaded bolt or adjustable screw-shaft $H^2$, the thread of which engages with a stationary nut on the upper inner portion of the beam $H^4$, all in such manner, as clearly shown, that by turning the adjusting bolt or screw $H^2$ the adjustable beam or bar $H^3$ may be moved or forced along in the direction indicated by the arrows at Figs. 1 and 2, for the purpose of moving outwardly the idler sprocket-wheel H to take up any undue slack in the endless sprocketed cable D, and thus keep said cable in a sufficiently taut and proper condition.

$l$ represents two rows of equidistant vertically-arranged piles or posts, the upper ends of which are on a level and each of which is provided with a suitable metallic cap-plate, upon which rests and to which is secured at proper intervals the metallic tube-like housing E, in which are arranged and travel during almost the entire length thereof each one of the two parallel and straight runs of the endless sprocketed cable. These two parallel tube-like metallic housings, which are thus supported upon and are securely fastened in two parallel lines to the upper ends of the two rows of supporting posts or piles $l$ are of course arranged, as clearly shown, at the line or level below the surface of the water, at which the endless drive-cable is designed to travel, and, as shown, (see particularly Fig. 5,) the cross-sectional shape of each of these tubular housings is such that while the sprocketed cable may be inserted within the housing and may be extricated therefrom through the central upper opening of the almost tubular device, said device so nearly surrounds or embraces the sprocketed cable as to prevent any casual extrication of the cable from said tubular housings, so that the latter insure the proper support and retention in place throughout its two long parallel runs of the endless sprocketed cable.

G represents a series of gondolas or pleasure-boats which float upon the surface of the water and which are connected with and are driven by the endless sprocketed cable D by the means and in the manner which I will presently explain. As shown in the drawings, there are two groups of these gondolas, each comprising three boats; but it will be understood, of course, that any number of boats that can be properly connected with and driven by the cable may be connected therewith at such points therein as may be desired.

F represents a series of almost conically-shaped inverted floats or buoys, which in practice are made of cedar wood, each one of which is coupled at its lower end to some one of a series of clamps $m$, that are secured to the endless cable D, each one of said floats F being provided, as shown, at its upper end with a hook 8, the eye or loop of which is fastened to a metallic rod which passes axially through the conically-shaped float, through the hook proper of which device passes loosely a cord or cable 9, which, as clearly shown, (see Figs. 3 and 4,) makes a triangular circuit, so to speak, embracing the hook 8 and two sheaves or tackle-blocks 10 10, attached to the rear upper portion or back corner of the hull or bed of the gondola G. This steadying or hold-back cord thus connecting the rear end of the gondola with the top of the float F operates to hold the back end of the boat or steer it to keep it practically in line with the traveling cable and to also assist in properly guiding the gondola as it turns the angles formed at either end of the endless cable, where the latter passes around the sprocket-wheels, as hereinbefore described.

To the upwardly-projecting eye or hook 2 of the clamp $m$ (see Fig. 3) is coupled by means of a snap-hook 3 the lower end of the obliquely-arranged coupler-bar or beam-link 4, the upper end of which, as will be clearly seen, is engaged with a similar snap-hook 5, secured to the forward end of the device, by which the gondola G is drawn along, said device consisting in the case shown of the rods 7 7, which extend forward convergently from the forward lower portion of the hull of the boat, and the bar or rod 6, which extends obliquely upward and rearward from the convergent point or junction of the rods 7 7 and is at its upper end secured, as shown, to the forward or upper portion of the hull of the boat at a point about in line with the center line of the hull.

The floats F are coupled, as shown, to the hooks 2 of the coupler-clamps $m$ by means of coupling links or devices 1 of any suitable construction, and by means of the group of devices arranged as just explained, forming the connections between the forward end of one gondola and the rear end of an immediately-preceding gondola. With the float-like devices F and the clamp $m$ of the cable with which said float is connected I am enabled to properly pull or impel along the first-mentioned boat and hold in proper position or steer the rear end of the last-mentioned boat, so that during the travel of the cable in the direction indicated by the arrow at Fig. 3 the pair of boats shown at said figure (supposing both of them to be geared or connected at both the front and rear ends to some one of the floats F) will be caused to travel substantially in the circuit of the drive-cable D of the plant.

Of course in the general operation of the contrivance shown the engine, although supposed, according to the drawings, to drive the cable only in the direction indicated by the arrows, may be reversed to drive the sprocketed cable in an opposite direction, and consequently effect the travel of the series of gondolas the other way, if occasion or circumstances require it or render this desirable, in which case, however, the connections between the boats and the float-like device F will of course be made in the opposite manner from that shown in the drawings, and the bridle-cords 9, so to speak, may be either disconnected from or engaged with the hooks 8, or said hooks may be simply swiveled or turned half-round, and as the connections between the pulling device attached to the front ends of the boats are coupled by some such means, as shown, to readily permit the uncoupling and re-engagement of the beam links or bars 4 with the hooks of the clamps $m$ and with the devices 6 and 7 of the gondola, it will be seen that not only am I enabled to easily effectuate any transposition of the boats relatively to the floats F that may be necessary in changing the direction of travel, but that I am, furthermore, enabled to remove and reapply any number in any order which may be desired of the gondolas or boats in the entire series of the plant. The arrangement of the long parallel runs of the sprocketed cable within the nearly tubular housing E, in substantially the manner shown and described, I consider an important element or feature of the contrivance, since thereby the boats or gondolas while traveling and while affected by wind and wave cannot drag the cable laterally at any point in its length, so as to either displace it relatively to its supporting devices or bring upon it any undue lateral strain during the running of the machinery.

By means of the adjustable idler H at one end of the endless cable I am enabled to keep the cable in the proper condition to prevent any undue buckling thereof at any point throughout its two long runs or any derangement in the proper relative and working positions of the cable, the housings in which the long runs of the cable travel, and the gearing or connecting devices between the cable and the floats that are geared to the boats. At the same time it will be observed that the whole arrangement of devices is simple, strong, and efficient for the intended purposes.

In practice I have found a plant precisely such as I have herein shown and described capable of successful operation under all natural conditions or surrounding circumstances. Of course as to many of the details of construction and as to the sizes and proportions of the parts many modifications may be made without changing the principle of construction or mode of operation of the contrivance shown and described.

Having now so fully explained the construction and operation of my improved cable-gondola system so that any skilled mechanic or engineer can practice my invention, either in the precise form shown or under some modification thereof, what I claim as new, and desire to secure by Letters Patent, is—

1. In combination with an endless cable or band arranged beneath the surface of the water and provided with suitable means and connections by which motion may be imparted to it by any suitable motor, one or more boats or gondolas connected with and impelled by said traveling cable through the medium of towing or pulling, connections between the forward end of the boat and said endless cable, and a float or series of floats having their upper ends or portions geared to or coupled with the rear end or ends of a gondola and having their lower ends connected with said cable or a series of gondolas, all in substantially the manner and for the purposes hereinbefore set forth.

2. The combination, with the endless impelling-cable provided with suitable clamps or means for attachment thereto of towing devices, of the gondola or boat provided at its forward end or bow with towing lines or rods 6 and 7, and a removable beam-link 4, connected at its upper end to said towing-lines and at its lower end to the clamps of the cable, all substantially in the manner and for the purposes hereinbefore set forth.

3. In combination with the impelling-cable D and the series of boats or gondolas, a series of intermediately-arranged floats F, suitable connections between the bow of the gondola and the impelling-cable, and the bridle-like connections 9 between the rear of the boat and the upper portion of the float, all substantially in the manner and for the purposes set forth.

In witness whereof I have hereunto set my hand this 1st day of October, 1891.

MICHAEL GARLAND.

In presence of—
HEZEKIAH M. GILLETT,
FRANK L. GRANT.